United States Patent [19]

Pinard et al.

[11] Patent Number: 5,703,942
[45] Date of Patent: Dec. 30, 1997

[54] PORTABLE TELEPHONE USER PROFILES USING CENTRAL COMPUTER

[75] Inventors: Deborah L. Pinard, Kanata; Kim D. Letkeman, Nepean, both of Canada

[73] Assignee: Mitel Corporation, Ontario, Canada

[21] Appl. No.: 636,777

[22] Filed: Apr. 19, 1996

Related U.S. Application Data

[63] Continuation of Ser. No. 262,783, Jun. 20, 1994, abandoned.

[30] Foreign Application Priority Data

Jul. 16, 1993 [CA] Canada ............... 2.100.699

[51] Int. Cl.⁶ ............................................. H04M 3/42
[52] U.S. Cl. ................... 379/207; 379/196; 379/201; 379/279; 379/357; 379/219
[58] Field of Search .................. 379/201, 207, 379/142, 144, 216, 211, 67, 95, 242, 219, 279, 357, 212, 196, 197, 198, 199, 200

[56] References Cited

U.S. PATENT DOCUMENTS

| | | | |
|---|---|---|---|
| 4,759,056 | 7/1988 | Akiyama | 379/142 |
| 4,899,373 | 2/1990 | Lee et al. | 379/207 |
| 5,181,238 | 1/1993 | Medamana et al. | 379/95 |
| 5,197,092 | 3/1993 | Bamburak | 379/201 |
| 5,222,125 | 6/1993 | Creswell et al. | 379/67 |
| 5,251,248 | 10/1993 | Tokunaga et al. | 379/67 |
| 5,353,331 | 10/1994 | Emery et al. | 379/67 |
| 5,509,058 | 4/1996 | Sestak et al. | 379/201 |

*Primary Examiner*—Krista M. Zele
*Assistant Examiner*—Scott Wolinsky
*Attorney, Agent, or Firm*—Charles E. Wands

[57] ABSTRACT

A method of invoking a telephone user profile comprised of storing in a database a user telephone service profile containing a directory number of a user, in association with a telephone set line, transmitting the user telephone service profile to a central computer, transmitting the service profile to a group of telephone office switches from the computer, storing the service profile at each of the telephone office switches in the group, and providing service to the user at each of the telephone office switches in the group in accordance with the service profile.

8 Claims, 2 Drawing Sheets

PORTABLE TELEPHONE USER PROFILES USING CENTRAL COMPUTER

This is a continuation of application Ser. No. 08/262,783, filed Jun. 20, 1994 abandoned.

FIELD OF THE INVENTION

This invention relates to telephony and particularly to a method of portably invoking telephone user profiles at variably designated telephone sets associated with a switching system, the profiles being stored at a central switching system.

BACKGROUND TO THE INVENTION

A user call operation profile (user profile), contains information pertinent to a telephone call which is specific to a user, such as the identity of a preferred network carrier, speed call information, class of service allowed, and/or other custom calling features. Antiquated equipment could not provide services using user profiles, and therefore to provide such services the antiquated equipment has been required to be replaced with modern equipment which stores such profiles. However even if user profiles are stored, they designate a particular piece of station apparatus (hereinbelow referred to as a telephone set), which is designated by a telephone number.

If a user wishes to temporarily or permanently move to a different physical location and use a different telephone set, either he has been restricted to using the profile associated with that telephone set, or the entire user profile for the different telephone set must be reprogrammed.

Another alternative to offer custom calling features to a remote telephone is to use a Centrex service, in which remote lines are connected directly to a Centrex central switching system. However this creates additional problems and cost, since there may be a significant number of calls desired between users at a remote location, and all such calls must be routed through the Centrex system. Thus a considerable number of Centrex lines must be used, whereas practically they may not all be needed to handle the traffic. Thus it is impossible to obtain the advantages of line concentration. In addition, portability of user profiles can be effected only with reprogramming for each telephone set.

SUMMARY OF THE PRESENT INVENTION

In the present invention, users at a remote location may utilize an inexpensive or antiquated remote switching system which does not store user profiles, yet provides the ability to not only offer custom calling features, but also portability of the user profiles from telephone set to telephone set connected to the remote switching system, without requiring reprogramming of the user profile for the telephone set at the new physical location of a user.

The remote switching system can recognize a prefix digit or group of digits (e.g. the numeral 9) which designate that a call is to be made from a local telephone to a telephone line or trunk connected to the central switching system, which causes the remote switching system to connect the user line directly to the trunk leading to the central system which controls further processing of the call, or by merely going off-hook, the local user is connected directly to the trunk, and subsequent digits are received directly by the central switching system, controlling either an outgoing call thereby, after retrieving the user profile from its database or controlling the remote switch to provide the custom calling features according to the user profile for an intra-office or an inter-office call, e.g. prefixing outgoing dialed digits with a network carrier number, etc.

Incoming calls to the remote switching system and the user telephone set are controlled by the central switching system after retrieving the user profile including the physical location of the telephone set (line) on the remote switching system, from the database in response to receiving the dialed digits.

A subsequent call can be made to a telephone number at the remote switching system wherein the remote switching system is connected to the central switching system via at least one trunk, further including receiving a call to the user telephone directory number via the central switching system, accessing the database and retrieving the profile and physical location data using the directory number dialed, and supervising the completion and process of the call using the profile, to the physical location.

A subsequent call can be made from a calling line connected to a remote switching system wherein the remote switching system is connected to the central switching system via at least one trunk, wherein the trunk is an ANI trunk or an R2 trunk with CLI, the user seizing the calling line, and dialing digits representing a call to or through the central switching system, recognizing a first digit or group of the dialed digits as an outgoing call to or through the central switching system, recognizing the physical location number of the calling line, at the central switching system and retrieving the profile, and controlling subsequent processing of the call by the central switching system using the profile.

A subsequent call is made from a calling line connected to a remote switching system wherein the remote switching system is connected to the central switching system via at least one trunk, wherein the trunk is an ANI trunk, the user seizing the calling line, recognizing the physical location number of the calling line at the central switching system and retrieving the profile, and controlling subsequent processing of the call by the central switching system using the profile.

A method of invoking a telephone user profile is comprised of storing in a database a user telephone service profile containing a directory number of a user, in association with a telephone set line location, receiving a command to change the telephone set line location associated with the user profile, and changing the line location in the database in response to the command, retrieving the profile and changed telephone set line location upon receipt of a request for completion of a call to the directory number, and completing the call to a telephone set at the changed line location.

Preferably the ANI trunk is a CAMA MF ANI trunk or an R2 trunk with CLI. This can also be used with a proprietary protocol which uniquely identifies the caller, (for example in the case of cellular, the phone identification number).

In accordance with an embodiment of the invention, a method of invoking a telephone user profile comprised of storing in a database a user telephone service profile containing a directory number of a user, in association with a telephone set line, transmitting the user telephone service profile to a central computer, transmitting the service profile to a group of telephone office switches from the computer, storing the service profile at each of the telephone office switches in the group, and providing service to the user at each of the telephone office switches in the group in accordance with the service profile.

BRIEF INTRODUCTION TO THE DRAWINGS

A better understanding of the invention will be obtained by reference to the detailed description below, in conjunction with the following drawings, in which:

FIGS. 1 and 2 are block diagrams of a system which can be used to implement the present invention.

DETAILED DESCRIPTION OF THE INVENTION

Figure 1:
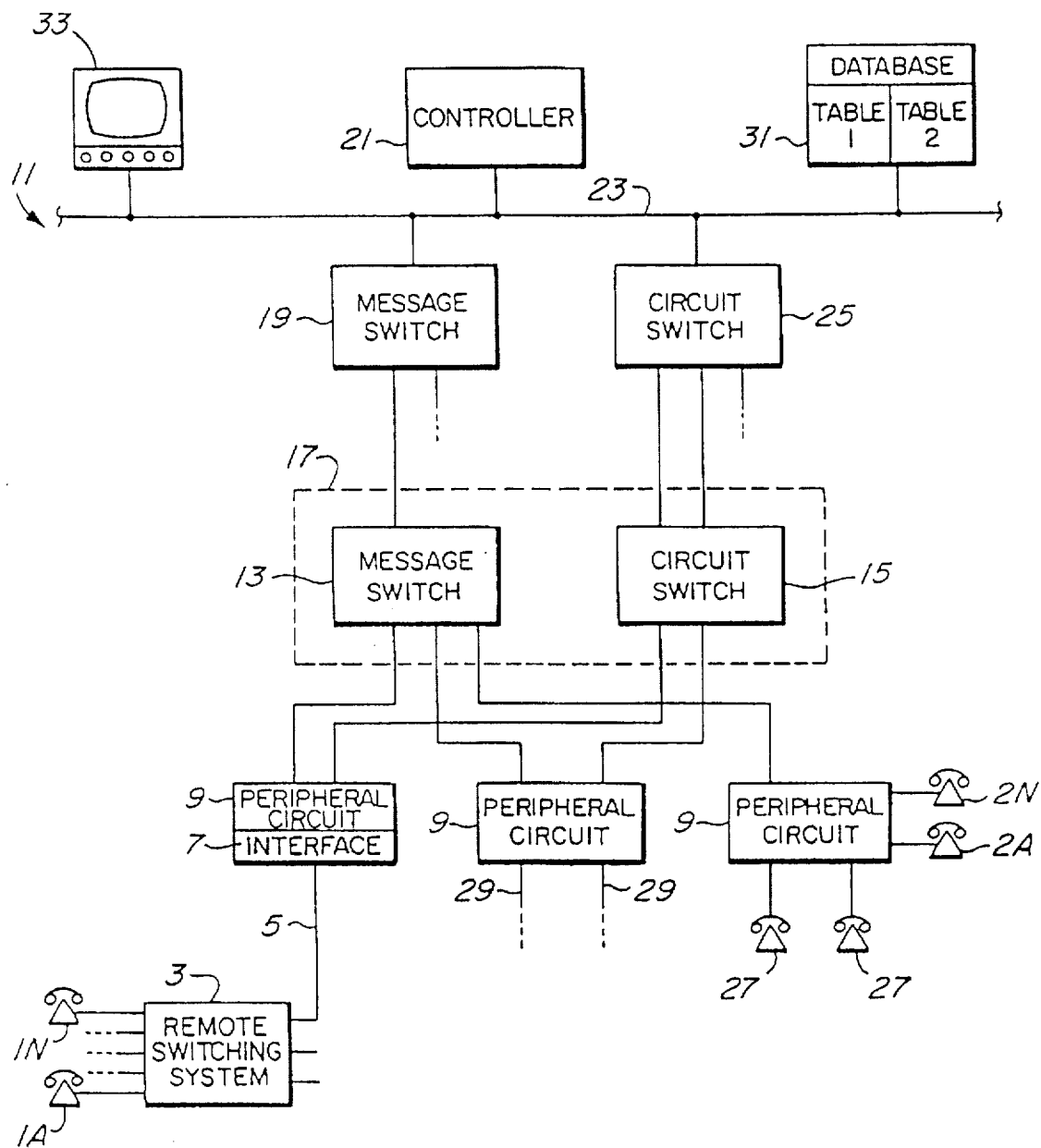

Turning to FIG. 1, plural user telephone lines 1A, 1N are connected to a remote switching system 3. The remote switching system has at least one trunk 5 preferably a CAMA MF ANI (centralized automatic message accounting, multi-frequency, automatic number identification) connected to a CAMAMF ANI interface 7 in one of peripheral circuits 9 of a central switching system 11. Peripheral circuits 9 are connected to message and circuit switches 13 and 15 respectively of a peripheral controller 17 of the central switching system 11. The peripheral controller message switch 13 is connected to a main system message switch 19 which communicates with a central switching system controller 21 via a main system bus 23. The peripheral controller circuit switch 15 is connected to a main system circuit switch 25, which communicates with controller 21 via bus 23. Controller 21 contains a central processing unit, a memory containing operation programs, etc. The peripheral circuits 9 contain line circuits, trunks, etc. which connect to local telephone sets 27, network trunks 29, etc.

The central switching system 11 containing peripheral circuits 9, message switches 19 and 13, circuit switches 15 and 25, bus 23 and controller 21 can be in the telephone system sold by Mitel Corporation as GX5000™. The remote switching system 3 can be a remote central office or PABX, which can be antiquated equipment such as a step switch switching system, a crossbar switching system such as No. 5 Crossbar, or a modern program controlled system such as SX2000™, GX5000™, sold by Mitel Corporation, etc.

In accordance with the present invention a database 31 is stored in a memory which is connected to bus 23. The database contains two tables, designated Table 1 and Table 2. Table 1 is a device activity map, and has an entry associated with each physical device, which contains the state of the device and current user data. The current user data is comprised of call record data for the call, and the user data associated with it. The call record data includes information about the current call and is a dynamic data structure. The user data is static, and contains the data programmed in by the customer for a particular phone number, the user profile.

In the present invention, fixed association between the telephone number and the particular physical telephone is broken; the particular telephone number is instead associated with the customer. Therefore what is programmed in by the customer for a particular telephone number relates to his own personal profile.

Table 2 contains the physical location (the particular telephone), currently being used by the customer's telephone number. Under control of controller 21, the two tables are updated dynamically, thus assigning a user, with the user's profile including the user's telephone number, to a physical telephone.

During the process of a call, the controller accesses the tables of the database, associating the user profile data with the location of a physical telephone (e.g. the particular line associated with particular remote switching system 3).

The user profile data contains at least a personal access code and directory number of the user. It also contains at least one, and likely all of data containing features and restrictions such as call forwarding, information, class of service, class of restriction, do not disturb settings, ring type, pick-up group number, interconnect number, call trace information, disconnect data, speed call information, network carrier numbers, etc. Each user having a particular telephone number has its own user profile characterized by the above.

The remote switching system 3 performs intra-office calls and interconnects telephone sets 1A–1N in a well known manner. This can be, for example, under full control of the remote switching system 3. However it is possible that remote switching system 3 is at least partly controlled by the central switching system 11, in a manner described in Canadian patent application serial number 2,052,498 filed Sep. 30th, 1991, inventors Kevin Johnson et al.

A user call operation profile is stored in database 31, in Tables 1 and 2, input either from a terminal 33 connected to bus 23 at the central switching system 11, or by a remote controlling means, or by updating the database from data stored on a floppy disk or the like.

When a user at telephone set 2A wishes to temporarily move to a different physical location where access is made to telephone set 2N, telephone set 1N is taken off hook and the user dials an access code, followed by his directory (telephone) number, followed by his personal account code. The access code is recognized by switching system 11 as designating a call for central switching system 11. The peripheral controller 17 receives the dialed digits and sends a message via message switches 13 and 19 to controller 21. Controller 21 accesses database 31. Using the personal account code as authorization, and the dialed telephone number as a match indicator to the user profile record, the controller 21 stores the new physical location of the user in Table 2, associated with the user profile stored in Table 1.

Now all calls designated for the particular telephone number of the user, as stored in Table 1, will be directed to the line circuit associated with telephone circuit 2N, rather than the line circuit associated with telephone set 2A, and the features and services of the user formerly associated with telephone set 1A will be associated with each call to that user's directory number. For subsequent calls to that user's directory number or from the newly designated telephone, the user'profile will be used in the processing of subsequent calls.

Assume now that there is an incoming call via system 11 from the network via a trunk 29, from a telephone set connected to remote switching system 3 or from a telephone set 27 connected to system 11, to the user. The telephone directory number digits are received at one of the peripherals 9 and a message is sent via message switches 13 and 19 to controller 21. Controller 21 accesses the database 31 for the directory number and retrieves the physical location of the called user as well as the user profile. Telephone set 2N is rung rather than telephone set 2A. After telephone set 2N goes off hook, answering the call, the call is processed in the normal way, subject to any restrictions or features of the called user profile stored in the user record of database 31.

If a call is to be made from a telephone set connected to the remote switching system 3, digits representing the call to or through the central switching system are dialed. The remote switching system 3 recognizes a prefix, such as the numeral 9, and seizes trunk 5. The ANI interface 7 in peripheral circuit 9 recognizes the physical location of the telephone set from which the call is being initiated, and provides that data to controller 21 through message switches 13 and 19. Controller 21 accesses the database 31, and retrieves the user profile of the calling party. The profile is used by the controller 21 to control the call and to provide features. For example, if the call is an outgoing call, the controller 21 can cause the peripheral circuit to seize an outgoing trunk to a particular network carrier as designated in the user profile, and if necessary to outpulse or MF signal prefix digits.

It should be noted that at least some lines connected to remote switching system 3 could alternatively be connected to peripheral circuits 9 directly, or immediately upon going off-hook through remote central switching 3, the latter for example if remote switching system 3 is a key telephone system. In such cases the peripheral circuit interfaces will recognize the physical location, i.e. the particular telephone set which is being used immediately, without prefix or access digits being dialed from the remote telephone set 1A–1N, allowing the controller 21 to retrieve the user profile from the database 31 as soon as the line has been identified by ANI interface 7. In these cases dial tone is provided from switching system 11.

It should be noted that since the user profiles are stored at the central switching system, the benefits of the invention can be provided to telephone sets connected to plural remote switching systems which connect to central switching system 11. The various users can change their locations and use different telephone sets without having to reprogram the database 31 while retaining their user profiles and resulting service; the only data which is changed is the physical location indicator in Table 2.

In addition, the remote switching systems provide both a remote intra-office switching function, and a concentration function; much fewer numbers of trunks between the switching systems are required than the total number of lines, which is a significant advantage over Centrex systems.

It will be recognized from an understanding of the above that content of the database 31 for each user can be modified in other ways. For example, the personal access code of any user could be changed for security purposes, e.g. by dialing a prefix code followed by the old personal access code followed by the new personal access code (twice for certainty). In a manner as described above the controller 21 recognizes the changed personal access code and stores it in Table 1 of database 31. This allows the user to modify his personal access code "password" against his directory number. Other kinds of codes could also be entered by the user, such as a "cancel" code for features, etc.

It will recognized that more than one user can be registered to one telephone set at the same time, although a particular user can only be registered to one telephone set at a time. If a second registration is made of a user to a different telephone set, the controller 21 performs an automatic registration cancel for the previous telephone set.

Figure 2:
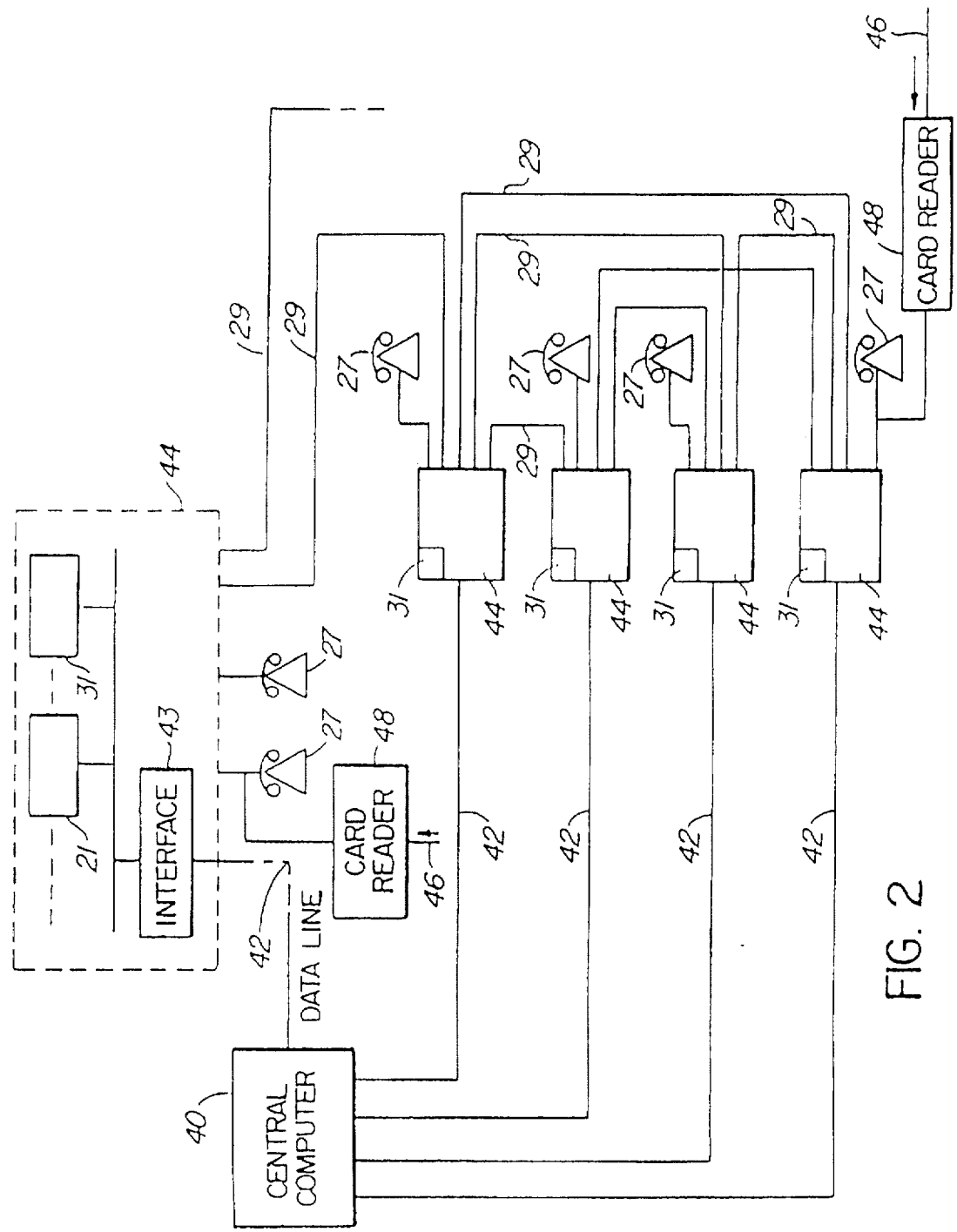

It should be noted that while the above description facilitates portable telephone numbers for a subscriber using a single or plural telephone switching office switches, plural telephone office switches 44 can be connected to a common central computer 40 such as a personal computer, each via a data line 42 such as an RS232 link, or using a modem or UART or the like (shown as interface 43) as shown in FIG. 2. The central computer 40 can receive instructions from one of the telephone office switches 44 via a data line 42 to propagate a user profile to a group of the telephone office switches 44, each of which store the profile in its database 31. This will create a network of switches which can be located in different geographical areas and which will recognize the user profile and provide predefined features, etc. to that user. Each user can have a unique network of switches recognize the profile. The user thus can roam from one geographical area to another and will be recognized, e.g. keeping the same telephone number, the same speed dial numbers, etc.

A group of switches can be as small as one, thus creating a network as small as two switches.

While the network can be set up and entered into the central computer by a network manager either directly or through a central office switch interface, the user may be allowed to enter the data to set up the network or to register his or her profile at a remote switch without requiring a network manager.

For this purpose an encoded card 46 can be used with a card reader 48 used in conjunction with a telephone set or line which on insert of the card automatically dials a feature access code, personal account code and telephone number, which causes immediate registration in conjunction with that line.

Since in this case the user has direct control over his personal account code, if the card is lost, he can change his password himself, anywhere in the network, therefore nullifying the lost card.

It should be noted that the card reader can be associated with the line itself, in which case the central office to which it is connected can recognize the line (and thus the location) to which the calls are to be directed and the service profile for incoming calls to the user number provided, or the card reader can be connected as a peripheral to the switching office itself, in which case the number of the line to which the above is provided can be keyed in to inform the switching office which line is to be associated with the user profile.

In order to call someone who is registered, the associated equipment number feature can be utilized. When a user registers himself either by keeping digits into a telephone set or by using a card reader, the central computer 40 is informed via data line 42. Using the subscriber I.D., the computer then automatically retrieves the user profile from database 31, or from a local database if there is one and propagates the user profile information to the other switches selected by the user if a group of switches has been selected, or to the switch on which the user has registered, and inserts an appropriate route as the associated equipment number for that device. On a particular switch, when a number is dialed, the switch checks from its database to determined whether the called number is locally available, and if not, then checks to see if a route has been programmed as an associated equipment number, and if so, uses it to reach the subscriber.

To propagate the information, the central computer preferably uses an existing forms package such as one which uses an interpreted TL1 format to program the information into the telephone switch.

To inform the central computer when a user registers, or changes his personal account code, the telephone switch initiates an automatic tl1 response (i.e. not in response to a manual command) reflecting the database update that occurred. This is sent to the central computer 40 over e.g. the RS232 link 42. On receipt of this message, the central computer generates commands and sends them via links 42 to store data appropriate changes to the data stored in databases 31 of the other switches.

A person understanding this invention may now conceive of alternative structures and embodiments or variations of the above. All of those which fall within the scope of the claims appended hereto are considered to be part of the present invention.

We claim:

1. A method of invoking a telephone user profile comprising:

(a) storing in a database a user telephone service profile containing
      (i) a directory number of a user, in association with a telephone set line location, and
      (ii) at least one of telephone feature data and telephone restriction data,
   (b) transmitting the user telephone service profile to a central computer,
   (c) transmitting said service profile to a group of telephone office switches from said computer,
   (d) storing said service profile at each of the telephone office switches in the group for use by each of the telephone office switches in processing calls which involve said directory number, and
   (e) providing service to said user at each of the telephone office switches in the group in accordance with said service profile.

2. A method as defined in claim 1 in which the service provided at each of the telephone office switches in the group includes recognition of a single telephone number for incoming calls to said user which is the same for all said switches in the group, resulting from access to said stored service profile at any of said switches.

3. A method as defined in claim 2 including:

(a) receiving a command to change the telephone set line location associated with said user profile, and changing said user telephone service profile in response to said command,
   (b) transmitting the changed user telephone service profile to a central computer,
   (c) transmitting said changed service profile to the group of telephone office switches from said computer, and
   (d) storing said changed profile at each of the telephone office switches in the group.

4. A method as defined in claim 2 in which the database is stored in a memory associated with a telephone switching office.

5. A method as defined in claim 2 in which the database is stored in a memory associated with said central computer.

6. A method as defined in claim 2, including storing user data on an encoded card, inserting the card into a card reader associated with a telephone line, reading the card, and storing said profile in association with said telephone line in said database.

7. A method as defined in claim 2 including storing user data on an encoded card, inserting the card into a card reader associated with a telephone line, reading the card, and storing instructions to direct all incoming calls to said directory number to said telephone line from all of the telephone office switches in the group.

8. A method as defined in claim 7 in which the number of telephone office switches in the group is one.

* * * * *